US012570300B2

(12) United States Patent
Wang et al.

(10) Patent No.: US 12,570,300 B2
(45) Date of Patent: Mar. 10, 2026

(54) AUTONOMOUS DRIVING SYSTEM AND AUTONOMOUS VEHICLE

(71) Applicant: Shenzhen Yinwang Intelligent Technologies Co., Ltd., Shenzhen (CN)

(72) Inventors: Yongjian Wang, Shenzhen (CN); Xiaoxiang Duan, Dongguan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 135 days.

(21) Appl. No.: 18/311,719

(22) Filed: May 3, 2023

(65) Prior Publication Data

US 2023/0339486 A1 Oct. 26, 2023

Related U.S. Application Data

(63) Continuation of application No. PCT/CN2021/095758, filed on May 25, 2021.

(30) Foreign Application Priority Data

Nov. 4, 2020 (CN) .......................... 202011217913.0

(51) Int. Cl.
 *B60W 50/06* (2006.01)
 *B60W 60/00* (2020.01)
(52) U.S. Cl.
 CPC .......... *B60W 50/06* (2013.01); *B60W 60/001* (2020.02); *B60W 2050/065* (2013.01); *B60W 2556/45* (2020.02)

(58) Field of Classification Search
 CPC ............... B60W 50/06; B60W 60/001; B60W 2556/45; B60W 2050/065
 See application file for complete search history.

(56) References Cited

U.S. PATENT DOCUMENTS

| | | | | |
|---|---|---|---|---|
| 2017/0366513 A1* | 12/2017 | Kumaran | ............ | H04L 63/0421 |
| 2018/0032764 A1* | 2/2018 | Kuwaki | .................. | G06F 21/86 |
| 2019/0304097 A1* | 10/2019 | Eade | ........................ | G06F 16/29 |
| 2020/0039481 A1* | 2/2020 | Aitidis | ....................... | B60T 7/12 |
| 2020/0104289 A1* | 4/2020 | Premawardena | ..... | G06F 16/182 |
| 2021/0116907 A1* | 4/2021 | Altman | ............. | B60W 60/0015 |

FOREIGN PATENT DOCUMENTS

| | | |
|---|---|---|
| CN | 110901561 A | 3/2020 |
| CN | 111768647 A | 10/2020 |

\* cited by examiner

*Primary Examiner* — Jay Khandpur
(74) *Attorney, Agent, or Firm* — WOMBLE BOND DICKINSON (US) LLP

(57) ABSTRACT

An autonomous driving system includes a plurality of sensor combinations and a plurality of edge nodes, each of the plurality of sensor combinations includes at least one sensor; the plurality of edge nodes are in a one-to-one correspondence with the plurality of sensor combinations; and a first edge node in the plurality of edge nodes is configured to determine first perception information of a vehicle based on data collected by a first sensor combination corresponding to the first edge node. A central node is connected to the plurality of edge nodes. The central node is configured to delegate a first state decision function to the first edge node so that the first edge node determines that the vehicle enters a first state or determines a first driving policy of the vehicle in the first state by executing the first state decision function.

18 Claims, 6 Drawing Sheets

AUTONOMOUS DRIVING SYSTEM AND AUTONOMOUS VEHICLE

CROSS-REFERENCE TO RELATED APPLICATIONS

This application is a continuation of International Application No. PCT/CN2021/095758, filed on May 25, 2021, which claims priority to Chinese Patent Application No. 202011217913.0, filed on Nov. 4, 2020, The disclosures of the aforementioned applications are hereby incorporated by reference in their entireties.

TECHNICAL FIELD

This application relates to the field of autonomous driving, and more particularly, to an autonomous driving system and an autonomous vehicle.

BACKGROUND

At present, as an automotive industry develops, a vehicle has an increasing quantity of functions.

In some approaches, various functions of the vehicle develop independent of each other. For example, an emergency braking assistive system and a surround view system are independent of each other, and there is no direct relationship between the emergency braking assistive system and the surround view system. Data between functions cannot be reused. For example, perception information determined by the surround view system cannot be used by the emergency braking assistive system. For the emergency braking assistive system, a sensor system that can sense environmental information needs to be specially disposed. This increases overall costs of the vehicle.

In some approaches, various functions of the vehicle are handled in a centralized manner. In other words, decision of functions is performed by a central node, and raw data collected by various sensors of the vehicle is also processed by the central node. In this solution, a control instruction of the central node is delegated to an execution component layer by layer, and the raw data collected by the sensors is also reported to the central node layer by layer. This leads to a long service execution delay.

SUMMARY

Embodiments of this application provide an autonomous driving system, so that data collected by a sensor can be processed by an edge node directly connected to the sensor, to obtain perception information, and the edge node performs related decision based on the perception information. This reduces a service execution delay:

In some embodiments, this application provides an autonomous driving system configured in a vehicle. The system includes: a plurality of sensor combinations, where each of the plurality of sensor combinations includes at least one sensor: a plurality of edge nodes, where the plurality of edge nodes are in a one-to-one correspondence with the plurality of sensor combinations, and a first edge node in the plurality of edge nodes is configured to determine first perception information of the vehicle based on data collected by a first sensor combination corresponding to the first edge node; and a central node connected to the plurality of edge nodes, where the central node is configured to delegate a first state decision function to the first edge node in the plurality of edge nodes, so that the first edge node determines that the vehicle enters a first state or determines a first driving policy of the vehicle in the first state by executing the first state decision function. Execution of the first state decision function requires at least the first perception information.

In some embodiments, the central node is configured to delegate the first state decision function to the first edge node in a driving state of the vehicle.

In some embodiments, the central node is configured to determine the first state decision function from a plurality of preset state decision functions based on the first sensor combination.

In some embodiments, the system further includes at least one executor. The at least one executor is configured to enable the vehicle to enter the first state or is configured to execute the first driving policy.

In some embodiments, the at least one executor is directly connected to the first edge node. The central node is configured to determine the first state decision function from a plurality of preset state decision functions based on the at least one executor.

In some embodiments, when the first edge node determines that the vehicle needs to enter the first state or the vehicle needs to execute the first driving policy, the first edge node sends a control instruction to the at least one executor, so that the vehicle enters the first state or the at least one executor executes the first driving policy.

In some embodiments, the central node is further configured to delegate a second state decision function to a second edge node in the plurality of edge nodes, so that the second edge node determines that the vehicle enters a second state or determines a second driving policy of the vehicle in the second state by executing the second state decision function. Execution of the second state decision function requires at least second perception information. The second perception information is determined by the second edge node based on data collected by a sensor combination corresponding to the second edge node. The second state is different from the first state.

In some embodiments, the execution of the first state decision function further requires third perception information. The third perception information is determined by a third edge node in the plurality of edge nodes based on data collected by a sensor combination corresponding to the third edge node. The third edge node is configured to send the third perception information to the first edge node when the third perception information is determined.

In some embodiments, the first state is any one of the following:

an over the air (OTA) state, a highway pilot (HWP) state, and an autonomous emergency braking (AEB) state.

In some embodiments, each of the plurality of edge nodes is directly connected to a sensor in a corresponding sensor combination.

In some embodiments, the edge node is an electronic control unit (ECU), and the central node is a domain controller.

In some embodiments, this application provides an autonomous driving system configured in a vehicle. The system includes: at least one executor, configured to enable the vehicle to enter a first state or configured to execute a first driving policy for the first state: a first edge node connected to the at least one executor; and a central node connected to the first edge node, configured to delegate a first state decision function to the first edge node, so that the first edge node determines whether the vehicle enters the first state or determines the driving policy of the vehicle in the first state. When the vehicle needs to enter the first state or the vehicle needs to execute the first driving policy for the first state, the first edge node sends a control instruction to the at least one executor, so that the vehicle enters the first state or the at least one executor executes the first driving policy.

In some embodiments, the system further includes: at least one sensor; and a second edge node directly connected to the at least one sensor, configured to: determine first perception information of the vehicle based on data collected by the at least one sensor, and send the first perception information to the first edge node, so that the first edge node executes the first state decision function based on the first perception information.

In some embodiments, the first edge node is directly connected to at least one sensor, and the first edge node is further configured to: determine first perception information of the vehicle based on data collected by the at least one sensor, and execute the first state decision function based on the first perception information.

In some embodiments, the central node is configured to determine the first state decision function from a plurality of preset state decision functions based on the at least one sensor.

In some embodiments, the at least one executor is directly connected to the first edge node, and the central node is configured to determine the first state decision function from a plurality of preset state decision functions based on the at least one executor.

In some embodiments, the first edge node is an electronic control unit (ECU), and the central node is a domain controller.

In some embodiments, this application provides an autonomous vehicle, including the system according to the embodiments discussed herein.

In the autonomous driving system provided in this embodiment of this application, data collected by a sensor of the vehicle may be processed by an edge node that is closest to the sensor or directly connected to the sensor, and the edge node performs related decision. This reduces a delay of executing a corresponding service by the vehicle. Alternatively, an edge node directly connected to an executor may perform related decision, and the executor executes the decision. This reduces a delay of executing a corresponding service by the vehicle.

DESCRIPTION OF EMBODIMENTS

The following describes technical solutions in embodiments of the present disclosure with reference to accompanying drawings. It is clear that the described embodiments are merely some rather than all of embodiments of this specification.

In descriptions of this specification, "an embodiment", "some embodiments", or the like indicates that one or more embodiments of this specification include features, structures, or characteristics described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner.

In the descriptions of this specification, "/" means "or" unless otherwise specified. For example, A/B may indicate A or B. In this specification, "and/or" describes merely an association relationship between associated objects and indicates that three relationships may exist. For example, A and/or B may indicate the following three cases: Only A exists, both A and B exist, and only B exists. In addition, in the descriptions of embodiments of this specification, "a plurality of" means two or more than two.

In the descriptions of this specification, terms "first" and "second" are merely intended for description, and shall not be understood as an indication or implication of relative importance or implicit indication of a quantity of indicated technical features. Therefore, a feature limited by "first" or "second" may explicitly or implicitly include one or more features. Terms "include", "contain", "have", and their variants all mean "include but are not limited to", unless otherwise specifically emphasized in another manner.

An electrical/electronic architecture (EEA) of a vehicle may include a star interconnection architecture, a full mesh architecture, a domain-based interconnection architecture, and a ring interconnection architecture.

Figure 1A:
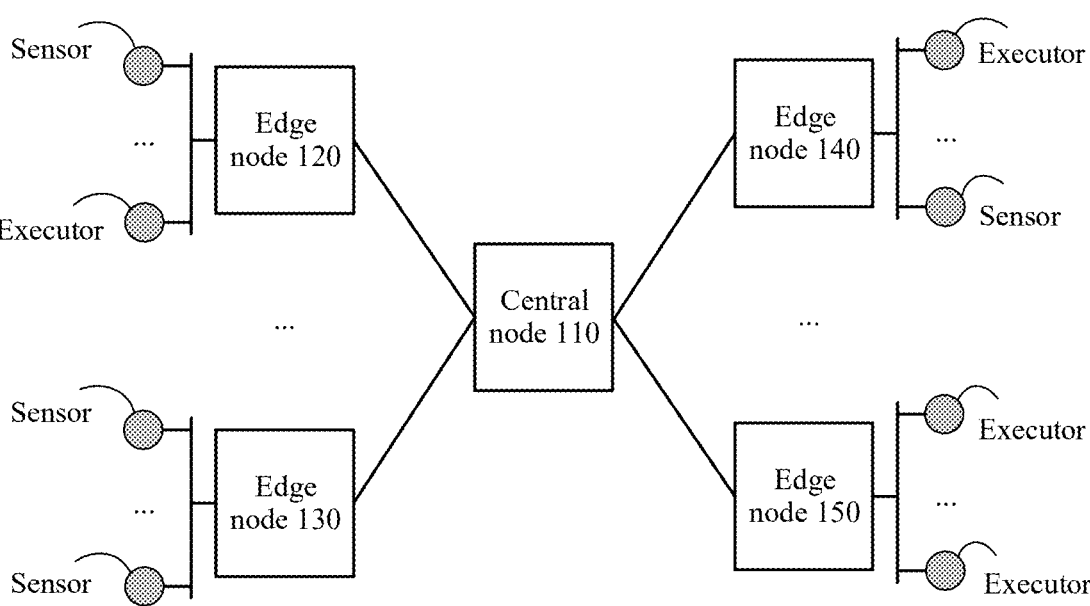
FIG. 1A shows a star interconnection architecture, according to some embodiments of the present disclosure.

The star interconnection architecture may be shown in FIG. 1A. The star interconnection architecture may include one or more central nodes such as a central node 110, and may further include a plurality of edge nodes such as an edge node 120, an edge node 130, an edge node 140, and an edge node 150. Each edge node may be directly connected to one or more sensors, and/or directly connected to one or more executors. In the star interconnection architecture, the central node can be directly connected to the edge node.

Figure 1B:
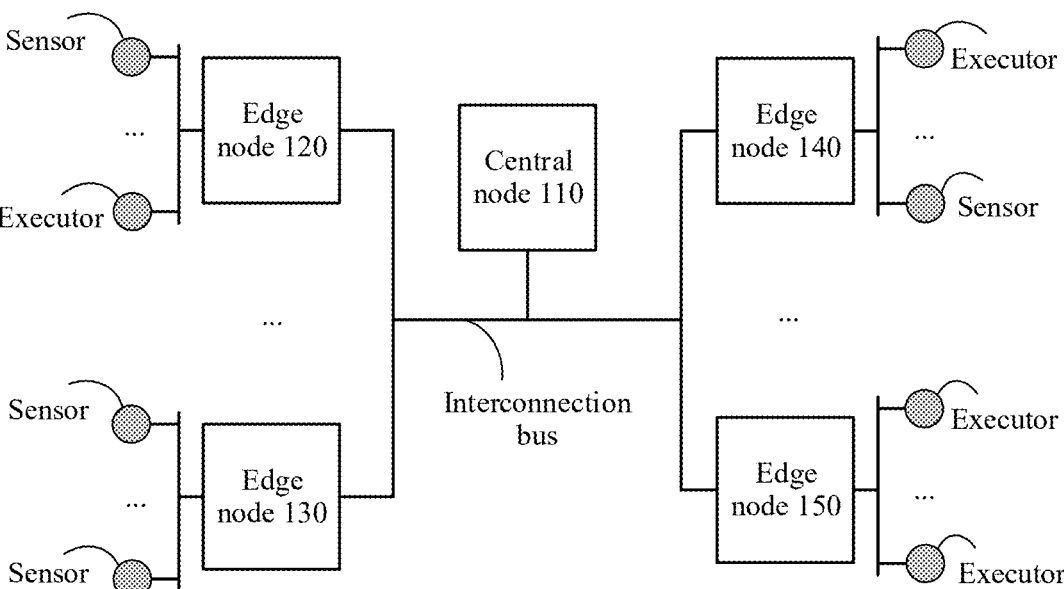
FIG. 1B shows a full mesh architecture, according to some embodiments of the present disclosure.

The one or more central nodes such as the central node 110, and the plurality of edge nodes such as the edge node 120, the edge node 130, the edge node 140, and the edge node 150 may further adopt the full mesh architecture. This may be specifically shown in FIG. 1B. Not only the central node and the edge node, but also an edge node and another edge node may be connected through an interconnection bus.

Figure 1C:
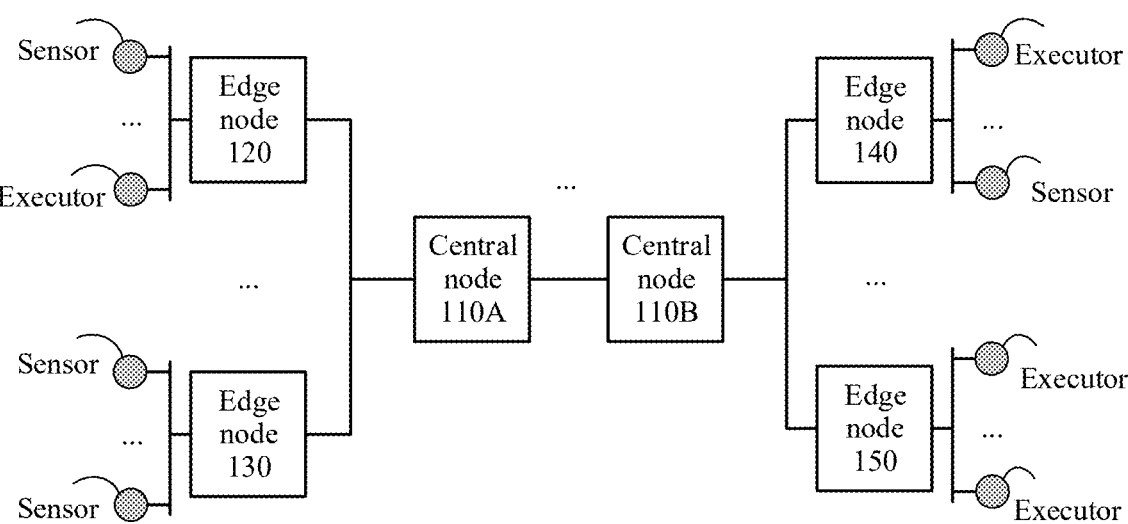
FIG. 1C shows a domain-based interconnection architecture, according to some embodiments of the present disclosure.

The one or more central nodes such as the central node 110, and the plurality of edge nodes such as the edge node 120, the edge node 130, the edge node 140, and the edge node 150) may further adopt the domain-based interconnection architecture. This may be specifically shown in FIG. 1C. In the domain-based interconnection architecture, the central node 110 may be divided into a central node 110A and a central node 110B. The central node 110A may serve as a domain controller, and form a domain with edge nodes such as the edge node 120 and the edge node 130. The central node 110B may serve as a domain controller, and form another domain with edge nodes such as the edge node 140 and the edge node 150. Nodes in different domains are indirectly connected through corresponding domain controllers.

Figure 1D:
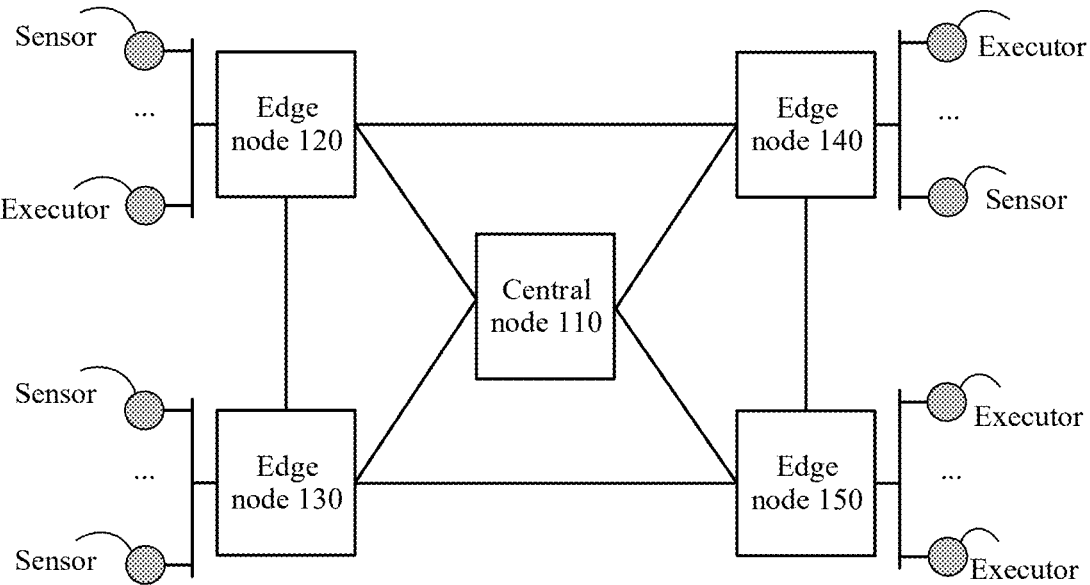
FIG. 1D shows a ring interconnection architecture, according to some embodiments of the present disclosure.

The one or more central nodes such as the central node 110, and the plurality of edge nodes such as the edge node 120, the edge node 130, the edge node 140, and the edge node 150 may further adopt the ring interconnection architecture. This may be specifically shown in FIG. 1D. Different edge nodes may be directly connected to each other, so that a ring network may be formed between the plurality of edge nodes. Each edge node may be directly connected to the one or more central nodes.

It should be noted that connections between the foregoing components are communication connections. The communication connections may be specifically implemented between the components through a local interconnect network (LIN) bus, a controller area network (CAN) bus, a hard wire, or the like.

In embodiments of this application, a direct connection between two components means that there is a direct communication link between the two components, and no other component is required to forward or transfer information.

In some embodiments, the one or more sensors directly connected to the edge node may include a sensor for collecting ambient environment information of a vehicle. The ambient environment information of the vehicle may be information of an object, for example, another vehicle, a pedestrian, a lane line, a road mandatory sign, a traffic signal light, an obstacle, or a road edge in an ambient environment of the vehicle. The information of an object may include an orientation and a distance of the object relative to the vehicle, or may include a movement speed and a movement direction of the object, and the like. These are not listed one by one herein. The sensor for collecting ambient environment information of a vehicle may be a camera, a radar, or the like. The radar may be a laser radar, a millimeter wave radar, an ultrasonic radar, or the like.

In some embodiments, the one or more sensors directly connected to the edge node may include a sensor for collecting information of the vehicle. The information of the vehicle may include controllable or changeable information of the vehicle, for example, a position of the vehicle, a driving speed, a driving direction, and the like. The information of the vehicle may also include information of an internal system of the vehicle, for example, an air temperature in a passenger compartment, a fuel capacity of a fuel tank, a temperature of a motor, and the like. Correspondingly, the sensor for collecting information of the vehicle may include a positioning component (the positioning component may be a global positioning system (GPS), a BeiDou navigation satellite system (BDS), a Galileo satellite navigation system, or the like), an inertial measurement unit (IMU), a temperature gauge in the passenger compartment, a fuel gauge, a temperature gauge at the motor, and the like.

In embodiments of this application, the one or more sensors directly connected to the edge node may be referred to as a sensor combination corresponding to the edge node. Sensors included in sensor combinations corresponding to different edge nodes may be different, partially the same, or all the same. This is not limited in embodiments of this application. In some embodiments, a sensor in a sensor combination corresponding to each edge node may be disposed.

The one or more executors directly connected to the edge node may be components configured to respond a control instruction to perform operations on a vehicle, such as decelerating, steering, accelerating, enabling an air conditioner, and the like. Specifically, the executor may include a brake component, a throttle, a steering component, an air-conditioning switch, and the like.

In embodiments of this application, the one or more executors directly connected to the edge node may be referred to as an executor combination corresponding to the edge node. Executors included in executor combinations corresponding to different edge nodes may be different, partially the same, or all the same. This is not limited in embodiments of this application. In some embodiments, an executor in an executor combination corresponding to each edge node may be disposed.

Based on the foregoing architectures, embodiments of this application provide an autonomous driving system. In the autonomous driving system, an edge node may process data collected by a sensor combination corresponding to the edge node, to obtain perception information of a vehicle in which the autonomous driving system is located. In addition, the edge node may receive a decision function delegated by a central node, and execute the decision function based on the perception information of the vehicle, to generate a control instruction on the vehicle, so as to instruct a related executor to perform a related operation. In the driving system, data collected by a sensor of the vehicle may be processed by an edge node that is closest to the sensor or directly connected to the sensor, and the edge node performs related decision. This reduces a delay of executing a corresponding service by the vehicle.

The following uses examples to describe, in different embodiments, the autonomous driving systems provided in embodiments of this application.

In an embodiment of this application, an edge node may be a component having a data processing function, for example, an electronic control unit (ECU). Raw data collected by a sensor combination corresponding to the edge node may be sent to the edge node for processing, to obtain perception information of a vehicle. It can be understood that the raw data collected by the sensor combination may include environment data of an environment in which the vehicle is located and/or information of the vehicle. Information included in the raw data is determined by a sensor corresponding to the raw data. For details of a sensor connected to the edge node, refer to the foregoing description. Details are not described herein again. Raw data collected by a sensor or a sensor combination may be used to determine the perception information of the vehicle. For example, a sensor combination corresponding to the edge node 120 may be set to include one or more cameras. Environment image data collected by the one or more cameras may be sent to the edge node 120. The edge node 120 may use a computer vision algorithm (for example, an object recognition algorithm, or a structure from motion (SFM) algorithm), to recognize an object in the environment image data, and obtain the perception information of the vehicle. For example, the sensor combination corresponding to the edge node 120 may be set to include a plurality of cameras and one or more radars. Environment image data collected by the plurality of cameras and point cloud data collected by the one or more radars may be sent to the edge node 120. The edge node 120 may use a multi-sensor fusion algorithm (for example, a Kalman filtering algorithm, a multi-Bayes estimation algorithm, or a neural network), to process the environment image data collected by the plurality of cameras and the point cloud data collected by the one or more radars, and obtain the perception information of the vehicle. In this embodiment, the edge node that is closest to the sensor or the sensor combination or that is directly connected to the sensor or the sensor combination may determine the perception information of the vehicle based on the raw data collected by the sensor or the sensor combination. In this way, the perception information can be quickly determined, to help reduce a service execution delay.

In some embodiments, when or after determining the perception information of the vehicle, the edge node may send the perception information to another edge node, so that the other edge node can reuse the perception information. Specifically, the edge node 120 and the edge node 150 are used as an example. The edge node 120 may send, to the edge node 150, perception information determined by the edge node 120. In this way, the edge node 150 can directly perform related decision based on the perception information, to perform related control on the vehicle. For example, the edge node 150 and the edge node 120 may establish an information subscription relationship in advance. In other words, the edge node 150 may subscribe to the perception information determined by the edge node 120, so that the edge node 120 can send the perception information to the edge node 150 each time the edge node 120 determines the perception information. In this embodiment, after determining the perception information of the vehicle, the edge node may share the perception information with another edge node. This implements information sharing between different service systems or domains of the vehicle.

The central node may be a component having a data processing function, for example, a domain controller. The central node may have a capability of executing various service functions of the vehicle, and may also have a capability of delegating one or more service functions to one or more edge nodes. In other words, in some embodiments, the central node may execute a service function. In some other embodiments, the central node may also delegate the service function to one or more edge nodes for execution.

In this embodiment of this application, the service function may also be referred to as a function for short. In some embodiments, the service function may be a function of determining, based on related information, whether the vehicle enters a state. In some embodiments, the service function may be a function of deciding or determining a driving policy of the vehicle in a state based on related information. In this embodiment of this application, the service function may also be referred to as a state decision function. Delegating the service function may also be referred to as delegating the state decision function. Delegating the service function or delegating the state decision function may mean delegating decision permission and a decision function of the service function. The state may also refer to a driving scenario, and may be specifically a highway pilot state, an over the air state, an autonomous emergency braking state, or the like. These are not listed one by one herein. The driving policy may be control on a driving process of the vehicle, for example, acceleration, deceleration, and steering. These are not listed one by one herein.

A delegating operation may include one or more operations. In some embodiments, the delegating operation may include: The central node sends, to one or more edge nodes, code used to implement one or more service functions, and sends a running instruction of the code to the one or more edge nodes. In this way: the one or more edge nodes can run the code in response to the running instruction, to execute the one or more service functions. In some embodiments, the one or more edge nodes may prestore code used to implement some or more service functions. The delegating operation may be that the central node sends a running instruction of the code to the one or more edge nodes, to instruct the one or more edge nodes to run the code and execute the one or more service functions.

It can be understood that different sensors may be used for different purposes. In other words, different sensors may correspond to different service functions (or state decision functions). In this way, the central node may determine one or more service functions based on a sensor corresponding to an edge node, and delegate the one or more service functions (or state decision functions) to the edge node. A highway pilot (HWP) service function is used as an example. A sensor combination A1 corresponding to the highway pilot service function includes three front-facing cameras, four lateral cameras, one rear-facing camera, four surround view cameras, four laser radars, one millimeter wave radar, 16 ultrasonic radars, and one inertial measurement unit. A sensor combination corresponding to the edge node 120 may be set to the sensor combination A1. The central node 110 may determine, based on a sensor included in the sensor combination A1, that a service function corresponding to the sensor combination A1 may be a highway pilot service function (or a highway pilot state decision function). In this way, the central node 110 may delegate the highway pilot service function (or the highway pilot state decision function) to the edge node 120. It should be noted that, in the embodiment of this application. "front-facing" refers to a front direction of the vehicle. "rear-facing" refers to a rear direction of the vehicle, and "lateral" refers to a lateral direction of the vehicle.

It should be noted that a correspondence between the sensor and the service function is merely an example for description, and is not a limitation. In some embodiments, a vehicle developer or designer may establish a correspondence between the sensor and the service function (or the state decision function) based on experience or experiments.

In another example, the central node may further determine an edge node based on a sensor corresponding to over the air (OTA), and delegate an over the air service function (or an over the air state decision function) to the determined edge node. Alternatively, the central node may determine an edge node based on a sensor corresponding to an autonomous emergency braking (AEB) service function, and delegate an autonomous emergency braking service function (or an autonomous emergency braking state decision function) to the determined edge node.

It can be understood that different executors correspond to or execute different service functions (or state decision functions). In other words, executors used when the vehicle enters different states may be different, and executors that are of the vehicle in different states and that execute a driving policy may be different. For example, executors such as a throttle and a steering component may perform operations such as acceleration, deceleration and steering when the vehicle is in the highway pilot state. That is, the throttle, the steering component, and the like generally correspond to the highway pilot service function (or the highway pilot state decision function). For another example, an executor such as a brake component may perform a braking operation when the vehicle is in the autonomous emergency braking state. That is, a component such as a brake usually corresponds to the autonomous emergency braking service function (or the autonomous emergency braking state decision function). It should be noted that the foregoing describes merely service functions corresponding to different executors as examples, and is not a limitation. In some embodiments, a vehicle developer or designer may establish a correspondence between the executor and the service function based on experience or experiments.

In some embodiments, the central node may determine one or more service functions (or state decision functions) based on an executor connected to the edge node, and delegate the one or more service functions (or state decision functions) to the edge node. In this embodiment, an edge node that is closest to or directly connected to the executor may perform decision of a service function (or a state decision function), and a control instruction is generated, so that the executor can obtain the control instruction as soon as possible, and perform an operation based on the control instruction. This can reduce a service execution delay.

In an example of these embodiments, when the vehicle is running, the central node may determine one or more service functions (or state decision functions) based on an executor connected to the edge node, and delegate the one or more service functions (or state decision functions) to the edge node.

The edge node may execute the one or more service functions received from the central node. In other words, after the central node delegates the one or more service functions to the edge node, the edge node may execute the one or more service functions. For example, when executing the one or more service functions, the edge node may perform decision based on perception information determined by the edge node. For example, when executing the one or more service functions, the edge node may receive, from another edge node, perception information determined by the other edge node, and perform decision based on the perception information. For example, when executing the one or more service functions, the edge node may receive, from another edge node, perception information determined by the other edge node, and perform decision based on the perception information determined by the other edge node and perception information determined by the edge node.

In some embodiments, to accelerate a response speed of the edge node to an outside world, an intelligence level of the edge node may be reduced, so that the edge node can execute a service function in a simple and direct data processing manner. In this way, an execution delay of the service function can be reduced. For example, compared with the edge node, the central node has a higher intelligence level and a stronger data processing capability, and may be configured to execute relatively complex functions such as prediction and inference. For example, the edge node may be referred to as a low-level control node, and the central node may be referred to as a high-level control node.

Next, in some embodiments, functions of the edge node and the central node are described as examples.

Figure 2:
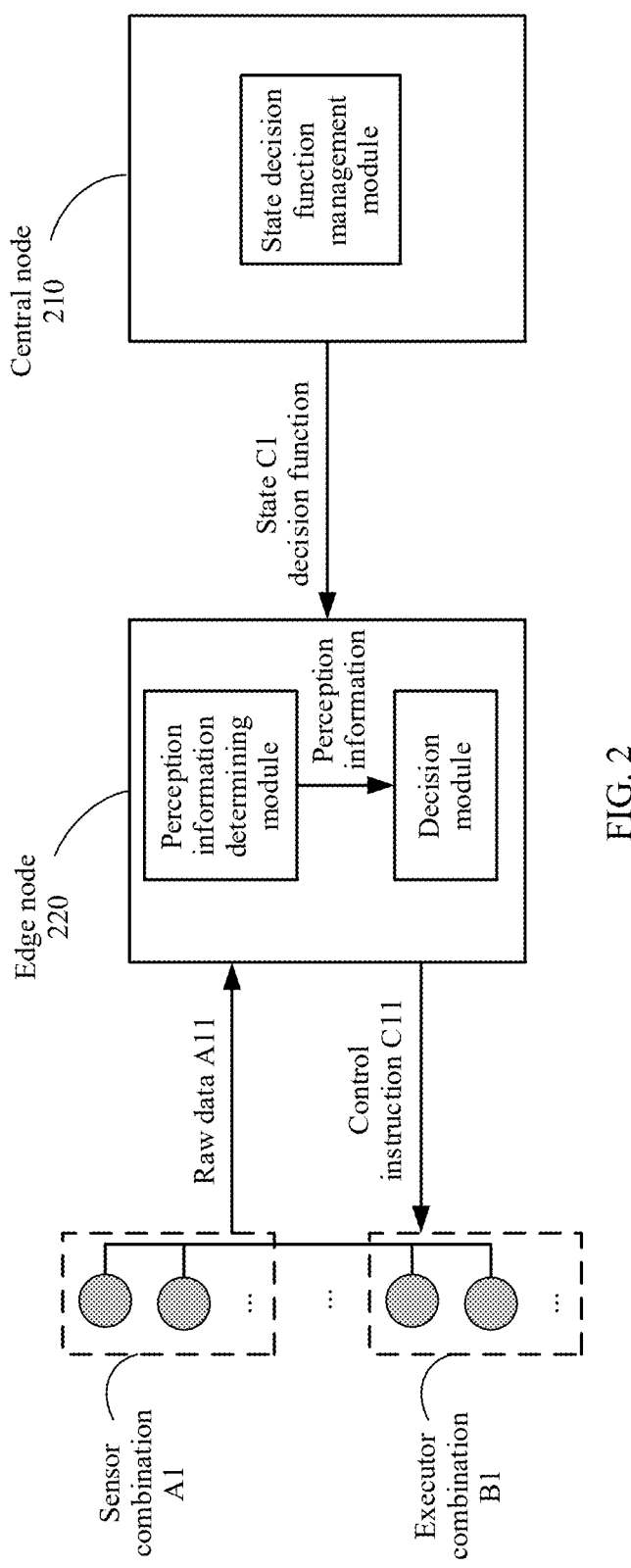
FIG. 2 shows an autonomous driving system according to an embodiment of the present disclosure.

Refer to FIG. 2. In some embodiments, an autonomous driving system of a vehicle may include a central node 210, an edge node 220, a sensor combination A1, and an executor combination B1.

The sensor combination A1 may include one or more sensors. The one or more sensors may be directly connected to the edge node 220, and send collected raw data A11 to the edge node 220. The edge node 220 may include a perception information determining module. The perception information determining module may determine perception information based on the raw data A11. For details, refer to the foregoing description. Details are not described one by one herein again.

The executor combination B1 may include one or more executors. The one or more executors may be directly connected to the edge node 220. The one or more executors may respond to a control instruction, to enable the vehicle to enter a state C1 or execute a driving policy of the vehicle in the state C1. The state may also refer to a driving scenario, and may be specifically a highway pilot state, an over the air state, an autonomous emergency braking state, or the like. These are not listed one by one herein. The driving policy may be control on a driving process of the vehicle, for example, acceleration, deceleration, and steering. These are not listed one by one herein.

The central node 210) may include a state decision function management module, which may be configured to manage a plurality of preset state decision functions. The central node 210) can determine a state decision function C1 from the plurality of preset state decision functions. The state decision function C1 is used to determine whether the vehicle enters a state C1 and/or determine a driving policy of the vehicle in the state C1.

In some embodiments, the central node 210 may determine the decision function for state C1 from the plurality of preset state decision functions based on a sensor in the sensor combination A1. For details, refer to the foregoing description. Details are not described herein again.

In some embodiments, the central node 210 may determine the decision function for state C1 from the plurality of preset state decision functions based on an executor in the executor combination B1.

In some embodiments, when or after determining the decision function for state C1, the central node 210 may delegate the decision function for state C1 to the edge node 220. For details, refer to the foregoing description. Details are not described herein again. For example, when the vehicle is running, the central node 210 delegates the decision function for state C1 to the edge node 220.

In some embodiments, as described above, the edge node 220 may prestore code used to implement the decision function for state C1. When or after determining the decision function for state C1, the central node 210 may delegate an execution instruction to the edge node 220, to instruct the edge node 220 to start running the code used to implement the decision function for state C1. For details, refer to the foregoing description. Details are not described herein again. For example, when the vehicle is running, the central node 210 delegates an execution instruction to the edge node 220.

The edge node 220 may include a decision module. The decision module can execute the decision function for state C1. Specifically, the decision module runs the code used to implement the decision function for state C1. As shown in FIG. 2, the decision module may obtain perception information from the perception information determining module, and determine decision function for state C1 whether the vehicle enters the state C1 or determine the driving policy of the vehicle in the state C1 based on the perception information by executing the decision function for state C1. When or after determining that the vehicle needs to enter the state C1 or the driving policy of the vehicle in the state C1, the decision module may generate a control instruction C11 used to instruct the vehicle to enter the state C1 or instruct the executor to execute the driving policy and send the control instruction C11 to the executor combination B1. The executor combination B1 may enable the vehicle to enter the state C1 or execute the driving policy based on the control instruction C11.

In an illustrative example, the state C1 is a highway pilot state. By executing the decision function for state C1, the decision module determines, based on the perception information, whether an environment in which the vehicle is located is suitable for enabling a highway pilot function, that is, whether the environment is suitable for entering the highway pilot state. If an environment in which the vehicle is located is suitable for enabling the highway pilot function, the decision module may generate a control instruction C11 used to instruct the vehicle to enable the highway pilot state, and send the control instruction C11 to the executor combination B1. The executor combination B1 may enable the highway pilot function based on the control instruction C11.

In an illustrative example, the state C1 is still the highway pilot state. When the vehicle is already in the highway pilot state, the decision module may generally execute the decision function for state C1 and determine, based on the perception information, whether the vehicle should steer. If a determining result is that the vehicle should steer, the decision module may generate a control instruction C11 that is used to instruct the vehicle to steer and send the control instruction C11 to the executor combination B1. A steering component in the executor combination B1 can perform vehicle steering based on the control instruction C11.

It should be noted that the autonomous driving system of the vehicle not only includes the edge node 220, but may further include another edge node. In some embodiments, the edge node 220 may further send, to the other edge node in the autonomous driving system, the perception information determined by the perception information determining module. The other edge node may use the perception information to execute a related service function and perform decision. The service function may be received by the other edge node from the central node 110. In other words, the central node 110 delegates the service function to the other edge node.

The foregoing uses merely the edge node 220 as an example to describe a function of the edge node and a relationship between the edge node and the central node. For another edge node included in the autonomous driving system, refer to the foregoing description of the edge node 220. Details are not described one by one herein again.

In the embodiment shown in FIG. 2, fast determining of the perception information may be implemented. This can reduce or help reduce a service execution delay. In addition, the executor can obtain the control instruction as soon as possible, and perform an operation based on the control instruction. This can further reduce the service execution delay.

Figure 3:
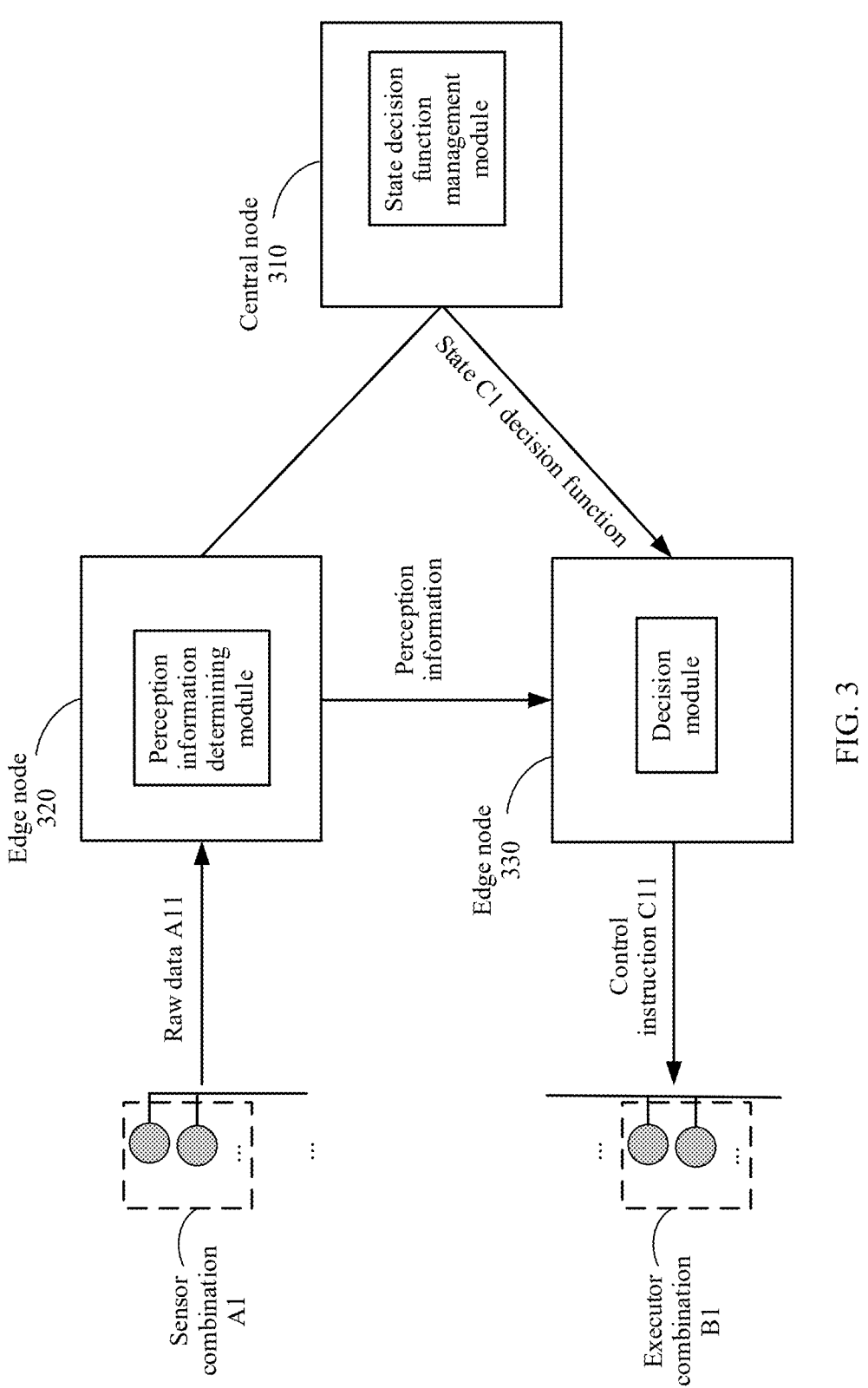
FIG. 3 shows another autonomous driving system according to an embodiment of the present disclosure.

Refer to FIG. 3. In some embodiments, an autonomous driving system of a vehicle may include a central node 310, an edge node 320, a sensor combination A1, an edge node 330, and an executor combination B1.

The sensor combination A1 may include one or more sensors. The one or more sensors may be directly connected to the edge node 320, and send collected raw data A11 to the edge node 320. The edge node 320 may include a perception information determining module. The perception information determining module may determine perception information based on the raw data A11. When or after determining the perception information, the edge node 320 may send the perception information to the edge node 330.

The executor combination B1 may include one or more executors. The one or more executors may be directly connected to the edge node 330. The one or more executors may respond to a control instruction, to enable the vehicle to enter a state C1 or execute a driving policy of the vehicle in the state C1.

The central node 310 may include a state decision function management module, and may be configured to manage a plurality of preset state decision functions. The central node 310 can determine a state decision function C1 from the plurality of preset state decision functions. For example, the central node 310 may determine the decision function for state C1 from the plurality of preset state decision functions based on an executor in the executor combination B1.

In some embodiments, when or after determining the decision function for state C1, the central node 310 may delegate the decision function for state C1 or an execution instruction to the edge node 330. For details, refer to the foregoing description of the embodiment shown in FIG. 2. Details are not described herein again.

The edge node 330 may include a decision module. The decision module may generate the control instruction C11 by executing the decision function for state C1 and based on the perception information received by the edge node 320. The edge node 330 may send the control instruction C11 to the executor combination B1, so that the executor in the executor combination B1 performs a related operation based on the control instruction C11. For details, refer to the foregoing description of the embodiment shown in FIG. 2. Details are not described herein again.

It should be noted that the autonomous driving system of the vehicle includes not only the edge node 320 and the edge node 330, but may further include another edge node. The foregoing uses merely the edge node 320 and the edge node 330 as an example to describe a function of the edge node and a relationship between the edge node and the central node. For another edge node included in the autonomous driving system, refer to the foregoing description of the edge node 320 or the edge node 330. Details are not described one by one herein again.

In the embodiment shown in FIG. 3, the executor can obtain the control instruction as soon as possible, and perform an operation based on the control instruction. This can reduce a service execution delay.

Figure 4:
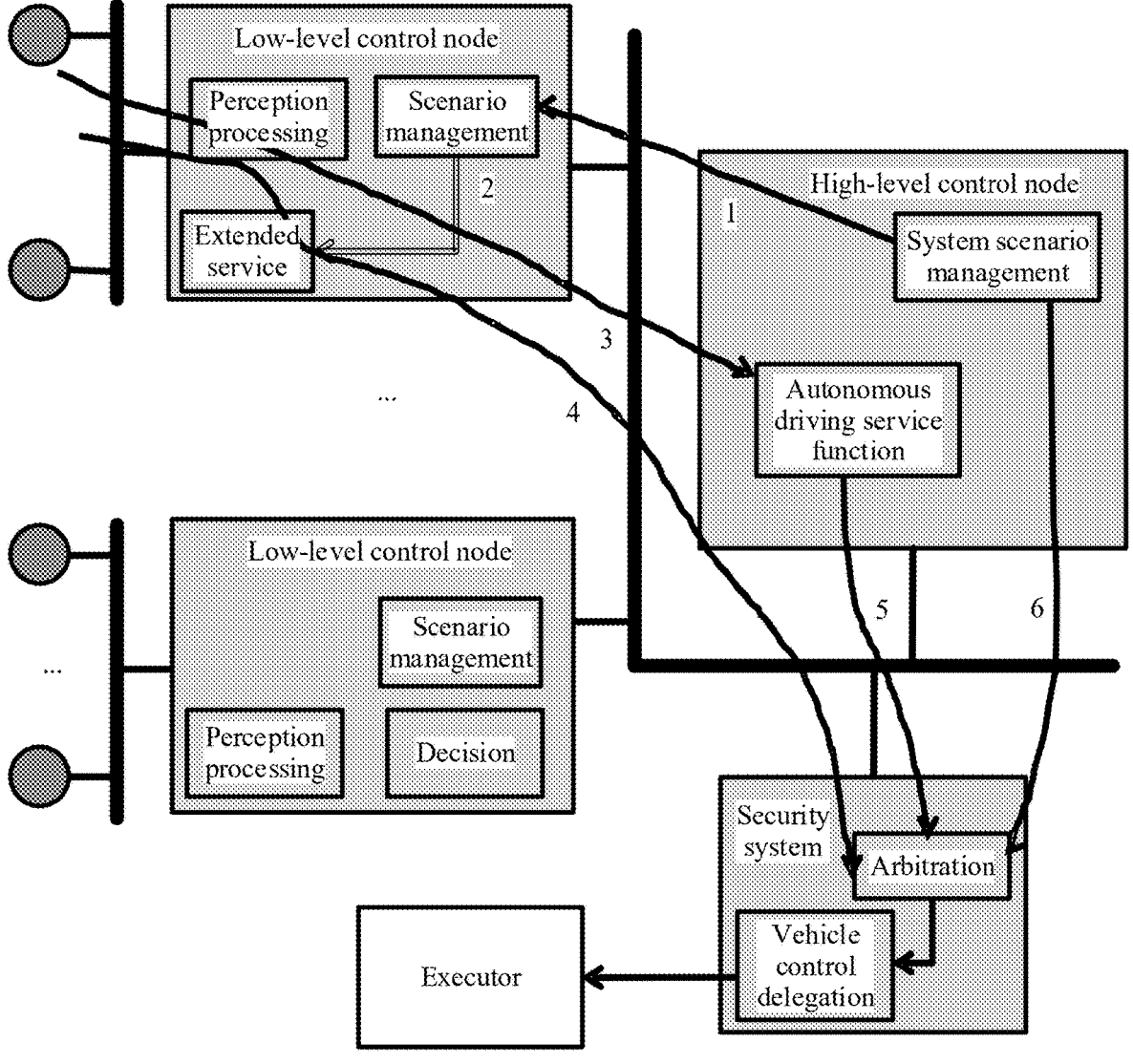
FIG. 4 shows still another autonomous driving system according to an embodiment of the present disclosure.

Next, with reference to FIG. 4, the autonomous driving system provided in this embodiment of this application is described by using an example.

In the example, the central node and the edge node may be different as follows.

a1: Different processing intelligence levels: Nodes are classified into low-level intelligence processing and high-level intelligence processing.

b1: Different response time: Generally, time requirements of a response to an outside world are different, and a node with a fast response speed has a simple processing function and low intelligence level. For high-level intelligent functions such as prediction and inference, logic is complex and a response is relatively slow:

c1: Different scenarios: Sensors are used for different purposes in different scenarios. A high-level control node sends information such as a control instruction and a local plan to each low-level processing node based on a scenario, to ensure that key action decision can be directly performed at the low-level processing node.

In this example, a hierarchical closed loop may be implemented, and details are as follows.

a2: A quick closed-loop based on a spatial position: Information collection (a camera and a radar)→low-intelligent processing→action (direction adjustment, distance focus, and the like). The closed loop is implemented by edge nodes, and the nodes are deployed in a distributed manner.

b2: A global comprehensive closed-loop: Information collection (all information collection points and all types)→high-level intelligent processing→action (vehicle control such as acceleration, braking, and steering). The closed loop is implemented by the edge node and the central node, and is deployed in a centralized manner through the high-level intelligent processing.

c2: Centralized control: Each control node separately delegates control information to a vehicle control delegation component, and ensures a reasonable output through a vehicle control arbitration mechanism.

In FIG. 4, a security system is equal to a low-level control node, and is a last node for final control delegation in the system. The security system may be placed inside the low-level or high-level node, or may be independent.

Next, a principle of FIG. 4 is described.

In the system, a related sensor is placed on the low-level control node or execution of a related function is performed on the low-level control node, and the high-level control node controls the whole system. An overall scenario or state management of the system is located on the high-level control node. After the system is enabled, scenario information of the system is sent to a corresponding low-level control node based on a service requirement (as shown by an indication line segment 1 and an indication line segment 6 in the figure). Nodes that are at different levels and that are of the system enable different functions based on corresponding scenarios (as shown by an indication line segment 2 in the figure). For a node that controls delegation of vehicle control information, which vehicle control information is used as final control information is determined based on a state of the central node and a state of a corresponding lower-level node.

In a system design phase, a deployment position of an extended service in the figure is determined based on principles such as a service feature, resource proximity, resource consumption, and function security. As shown in FIG. 4, a normal autonomous driving service is shown by an indication line segment 3 and an indication line segment 5. However, a set of other functions need to be implemented at the same time. As shown in a corresponding process indication line segment 4, the functions may exist simultaneously or independently. This simplifies a service processing process and ensures independence of the process.

Figure 5:
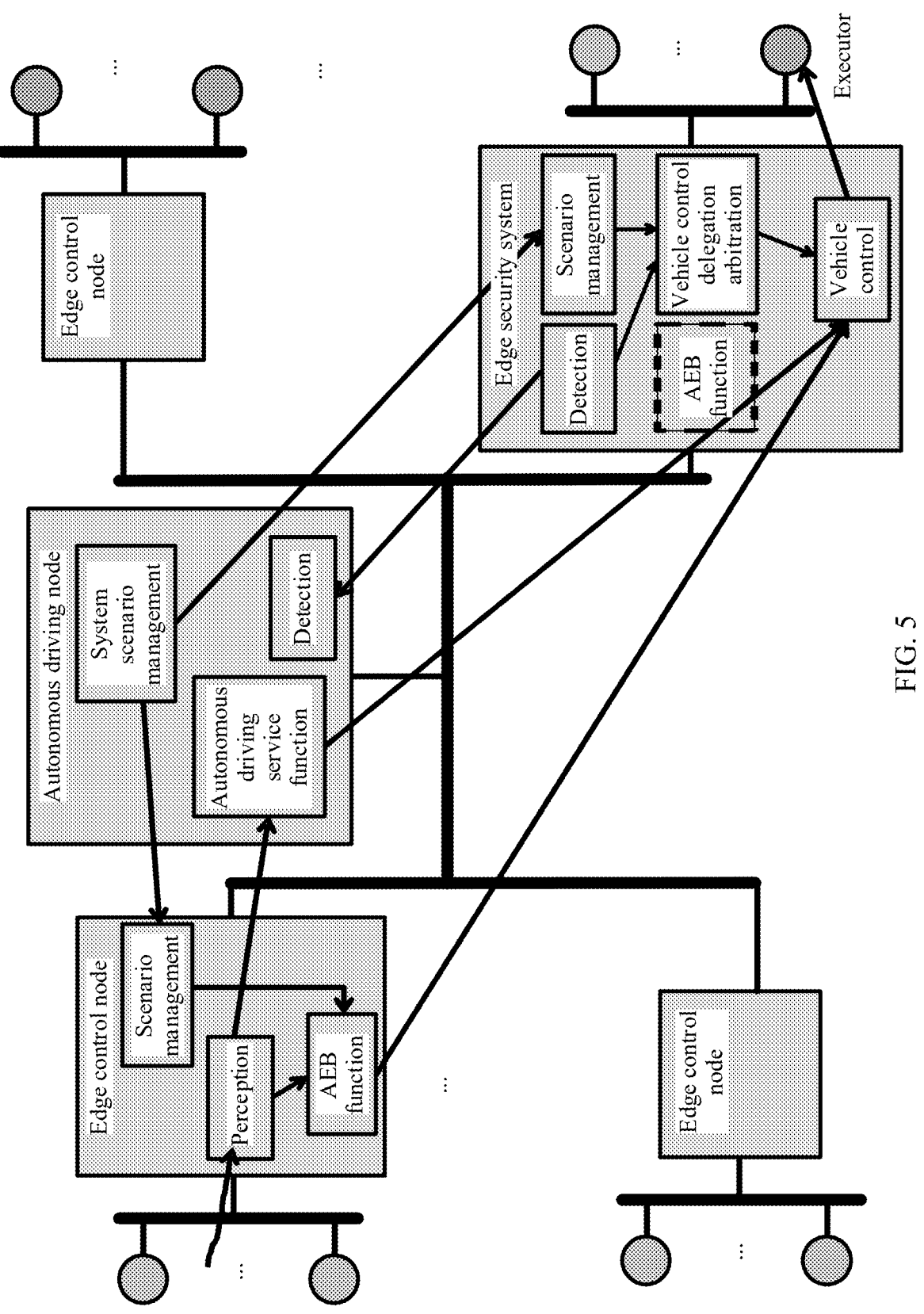
FIG. 5 shows yet another autonomous driving system according to an embodiment of the present disclosure.

Next, with reference to FIG. 5, an autonomous emergency braking (AEB) function is used as an example, to describe the autonomous driving system provided in this embodiment of this application.

FIG. 5 is an application example in which an autonomous driving system and an assisted driving system coexist in a networking solution according to an embodiment of this application. The AEB function is deployed, based on function security, resource consumption, response time requirements, and the like, in an edge node or an edge security system that is the same as a required sensor. Perception data is sent to the AEB and an autonomous driving service based on a service requirement and processed separately. The two services can run independently or simultaneously. The security system detects state information of nodes such as the autonomous driving system, and determines, based on a priority of each control instruction, information used as a final output.

The autonomous driving system provided in this embodiment of this application may implement hierarchical decision (centralized control and edge control). In addition, each control node may determine, based on a scenario, an operation policy and decision control in a corresponding scenario. The low-level node can respond quickly based on a scenario.

This can implement distributed computing processing. When some nodes are abnormal, some services can be still processed.

In the solution provided in this embodiment of this application, each node evolves independently: Each node evolves independently when an interface remains unchanged.

In the autonomous driving system provided in this embodiment of this application, various sensor capabilities of the autonomous driving system may be reused, and no additional investment is required for the assisted driving system.

The autonomous driving system provided in this embodiment of this application can reduce complexity of the central node.

The autonomous driving system provided in this embodiment of this application uses a hierarchical manner, and the sensor and the low-level node may be deployed nearby. The low-level node has simple processing logic and a fast response speed, shares part of centralized control capabilities, and achieves part of function security objectives.

In the autonomous driving system provided in this embodiment of this application, each domain directly uses a unified in-vehicle network, and supports high-speed interworking and on-demand mounting of systems of different vehicle models.

The autonomous driving system provided in this embodiment of this application provides a global publishing notification mechanism of an intelligent sensor based on a service-oriented idea, and quickly introduces a sensor.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. An autonomous driving system, configured in a vehicle, wherein the system comprises:

a plurality of sensor combinations on the vehicle, wherein each of the plurality of sensor combinations comprises at least one sensor;

a plurality of edge nodes on the vehicle, wherein the plurality of edge nodes are in a one-to-one correspondence with the plurality of sensor combinations, each of the plurality of edge nodes is directly connected on the vehicle to at least one sensor in a corresponding sensor combination, and a first edge node in the plurality of edge nodes is configured to determine first perception information of the vehicle based on data collected by a first sensor combination corresponding to the first edge node;

a central node on the vehicle connected to the plurality of edge nodes, wherein the central node is configured to delegate a first state decision function to the first edge node, so that the first edge node determines that the vehicle enters a first state or determines a first driving policy of the vehicle in the first state by executing the first state decision function, and execution of the first state decision function requires at least the first perception information; and at least one executor on the vehicle and configured, based on a control instruction from the first edge node, to enable the vehicle to enter the first state or is configured to execute the first driving policy.

2. The system according to claim 1, wherein the central node is configured to delegate the first state decision function to the first edge node in a driving state of the vehicle.

3. The system according to claim 1, wherein the central node is configured to determine the first state decision function from a plurality of preset state decision functions based on the first sensor combination.

4. The system according to claim 1, wherein the at least one executor is directly connected to the first edge node, and the central node is configured to determine the first state decision function from a plurality of preset state decision functions based on the at least one executor.

5. The system according to claim 1, wherein when the first edge node determines that the vehicle needs to enter the first state or the vehicle needs to execute the first driving policy, the first edge node sends the control instruction to the at least one executor, so that the vehicle enters the first state, or the at least one executor executes the first driving policy.

6. The system according to claim 1, wherein the central node is further configured to delegate a second state decision function to a second edge node in the plurality of edge nodes, so that the second edge node determines that the vehicle enters a second state or determines a second driving policy of the vehicle in the second state by executing the second state decision function; and execution of the second state decision function requires at least second perception information, the second perception information is determined by the second edge node based on data collected by a sensor combination corresponding to the second edge node, and the second state is different from the first state.

7. The system according to claim 1, wherein the execution of the first state decision function further requires third perception information, the third perception information is determined by a third edge node in the plurality of edge nodes based on data collected by a sensor combination corresponding to the third edge node, and the third edge node is configured to send the third perception information to the first edge node when the third perception information is determined.

8. The system according to claim 1, wherein the first state is any one of the following:

an over the air (OTA) state, a highway pilot (HWP) state, and an autonomous emergency braking (AEB) state.

9. The system according to claim 1, wherein the first edge node is an electronic control unit (ECU), and the central node is a domain controller.

10. An autonomous driving system, configured in a vehicle, wherein the system comprises:

at least one executor on the vehicle and configured, based on a control instruction from a first edge node on the vehicle, to enable the vehicle to enter a first state or configured to execute a first driving policy for the first state;

wherein the first edge node is connected to the at least one executor and directly connected to at least one sensor; and a central node on the vehicle connected to the first edge node, configured to delegate a first state decision function to the first edge node, so that the first edge node determines whether the vehicle enters the first state or determines the first driving policy of the vehicle in the first state, wherein when the vehicle needs to enter the first state or the vehicle needs to execute the first driving policy for the first state, the first edge node sends the control instruction to the at least one executor, so that the vehicle enters the first state or the at least one executor executes the first driving policy.

11. The system according to claim 10, wherein the system further comprises:

a second edge node directly connected to at least one other sensor, configured to: determine first perception information of the vehicle based on data collected by the at least one other sensor, and send the first perception information to the first edge node, so that the first edge node executes the first state decision function based on the first perception information.

12. The system according to claim 10, wherein the first edge node is further configured to: determine first perception information of the vehicle based on data collected by the at least one sensor, and execute the first state decision function based on the first perception information.

13. The system according to claim 12, wherein the central node is configured to determine the first state decision function from a plurality of preset state decision functions based on the at least one sensor.

14. The system according to claim 10, wherein the at least one executor is directly connected to the first edge node, and the central node is configured to determine the first state decision function from a plurality of preset state decision functions based on the at least one executor.

15. The system according to claim 10, wherein the first edge node is an electronic control unit (ECU), and the central node is a domain controller.

16. An autonomous vehicle, comprising:

a plurality of sensor combinations on the vehicle, wherein each of the plurality of sensor combinations comprises at least one sensor;

a plurality of edge nodes on the vehicle, wherein the plurality of edge nodes are in a one-to-one correspondence with the plurality of sensor combinations, each of the plurality of edge nodes is directly connected on the vehicle to at least one sensor in a corresponding sensor combination, and a first edge node in the plurality of edge nodes is configured to determine first perception information of the vehicle based on data collected by a first sensor combination corresponding to the first edge node;

a central node on the vehicle connected to the plurality of edge nodes, wherein the central node is configured to delegate a first state decision function to the first edge node, so that the first edge node determines that the vehicle enters a first state or determines a first driving policy of the vehicle in the first state by executing the first state decision function, and execution of the first state decision function requires at least the first perception information; and at least one executor on the vehicle and configured, based on a control instruction from the first edge node, to enable the vehicle to enter the first state or is configured to execute the first driving policy.

17. The vehicle according to claim 16, wherein the central node is configured to delegate the first state decision function to the first edge node in a driving state of the vehicle.

18. The vehicle according to claim 16, wherein the central node is configured to determine the first state decision function from a plurality of preset state decision functions based on the first sensor combination.

* * * * *